(12) United States Patent
Rollinger et al.

(10) Patent No.: US 9,175,783 B2
(45) Date of Patent: Nov. 3, 2015

(54) VACUUM-ACTUATED WASTEGATE

(71) Applicant: Ford Global Technologies, LLC, Dearborn, MI (US)

(72) Inventors: John Eric Rollinger, Sterling Heights, MI (US); David Bell, Plymouth, MI (US); Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 13/679,761

(22) Filed: Nov. 16, 2012

(65) Prior Publication Data

US 2014/0138562 A1    May 22, 2014

(51) Int. Cl.
*F02B 33/44* (2006.01)
*F02D 23/00* (2006.01)
*F02M 25/07* (2006.01)
*F16K 31/12* (2006.01)
*F02B 37/18* (2006.01)

(52) U.S. Cl.
CPC ............... *F16K 31/12* (2013.01); *F02B 37/186* (2013.01); *Y02T 10/144* (2013.01)

(58) Field of Classification Search
CPC ........ F02B 37/18; F02B 37/16; F02B 37/186; F02M 25/0707; F02M 25/0713; F02M 25/0722; F16K 31/12
USPC .............. 60/397–398, 602, 605.1–605.2, 611
See application file for complete search history.

(56) References Cited

U.S. PATENT DOCUMENTS

| | | | |
|---|---|---|---|
| 4,251,050 A | 2/1981 | McInerney | |
| 4,392,352 A | 7/1983 | Stumpp et al. | |
| 4,463,564 A | 8/1984 | McInerney | |
| 6,467,270 B2 | 10/2002 | Mulloy et al. | |
| 6,670,067 B2 | 12/2003 | Sato et al. | |
| 6,742,335 B2 | 6/2004 | Beck et al. | |
| 6,769,244 B2 | 8/2004 | Headley et al. | |
| 6,820,587 B1 | 11/2004 | Hoglund et al. | |
| 6,951,199 B2 | 10/2005 | Suzuki | |
| 7,848,870 B2 | 12/2010 | Hirooka | |

(Continued)

FOREIGN PATENT DOCUMENTS

JP    2003210927 A  *  7/2003  ............. B01D 46/04

OTHER PUBLICATIONS

Machine Translation of Description of JP 2003210927 A, published on Jul. 29. 2003, entire document.*

(Continued)

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP

(57) ABSTRACT

Embodiments for vacuum generation are provided. In one example, a method comprises when boost is below a threshold, generating vacuum with an actuator in a first position by flowing air from a compressor outlet to an intake manifold through a first ejector, and when boost is above the threshold, generating vacuum with the actuator in a second position by flowing air from the compressor outlet to a compressor inlet through a second ejector. In this way, vacuum may be generated by more than one ejector via actuation of a common actuator.

18 Claims, 9 Drawing Sheets

(56) References Cited

U.S. PATENT DOCUMENTS

| | | | |
|---|---|---|---|
| 7,966,996 | B1 | 6/2011 | Pursifull |
| 8,047,185 | B2 | 11/2011 | Ulrey et al. |
| 8,176,894 | B2 | 5/2012 | Ulrey et al. |
| 2006/0185514 | A1* | 8/2006 | Schwalm et al. .................. 96/4 |
| 2010/0043429 | A1 | 2/2010 | Wolk et al. |
| 2010/0300413 | A1 | 12/2010 | Ulrey et al. |
| 2011/0073082 | A1 | 3/2011 | Hattori et al. |
| 2011/0120432 | A1 | 5/2011 | Ulrey et al. |
| 2011/0132311 | A1* | 6/2011 | Pursifull et al. ......... 123/184.56 |
| 2011/0138807 | A1* | 6/2011 | Ulrey et al. ................... 60/605.1 |
| 2011/0247595 | A1 | 10/2011 | Ogita et al. |
| 2012/0110995 | A1 | 5/2012 | Ulrey et al. |
| 2012/0117977 | A1* | 5/2012 | Childers et al. ................. 60/782 |
| 2012/0222419 | A1* | 9/2012 | Hittle et al. .................. 60/605.1 |
| 2012/0237368 | A1 | 9/2012 | Pursifull et al. |

OTHER PUBLICATIONS

Pursifull, Ross Dykstra et al., "Crankcase Ventilation and Vacuum Generation," U.S. Appl. No. 13/533,871, filed Jun. 26, 2012, 43 pages.

Beshay, Mansour et al., "Aspirator for Crankcase Ventilation and Vacuum Generation," U.S. Appl. No. 13/459,226, filed Jul. 13, 2012, 43 pages.

Ulrey, Joseph Norman et al., "Method and System for Vacuum Generation," U.S. Appl. No. 13/670,644, filed Nov. 7, 2012, 37 pages.

Pursifull, Ross Dykstra, "Vacuum-Actuated Wastegate," U.S. Appl. No. 13/679,647, filed Nov. 16, 2012, 44 pages.

Ulrey, Joseph Norman et al., "Vacuum-Actuated Wastegate," U.S. Appl. No. 13/679,700, filed Nov. 16, 2012, 44 pages.

* cited by examiner

US 9,175,783 B2

VACUUM-ACTUATED WASTEGATE

FIELD

The present disclosure relates to an internal combustion engine.

BACKGROUND AND SUMMARY

Turbochargers may improve engine torque/power output density. A turbocharger may include a compressor and a turbine connected by a drive shaft, where the turbine is coupled to an exhaust manifold side and the compressor is coupled to an intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, for example with a wastegate.

Wastegates may be actuated pneumatically, hydraulically, or electrically. In one example, a wastegate may be actuated via boost pressure produced by the turbocharger. However, it may be advantageous to open the wastegate during low- or no-boost conditions, in order to reduce pumping losses and improve fuel economy. Thus, vacuum-actuated wastegates have been developed to allow for wastegate control during low boost conditions. While vacuum-actuated wastegates may provide robust wastegate control during conditions of high engine vacuum, during higher-boost conditions, the engine intake manifold vacuum used to provide vacuum to actuate the wastegate is not available. A separate vacuum pump may be provided to supply the needed vacuum when engine vacuum is not available, thus wasting fuel.

The inventors have recognized the issues with the above approach and offer a method to at least partly address them. In one embodiment, a method comprises when boost is below a threshold, generating vacuum with an actuator in a first position by flowing air from a compressor outlet to an intake manifold through a first ejector, and when boost is above the threshold, generating vacuum with the actuator in a second position by flowing air from the compressor outlet to a compressor inlet through a second ejector.

In this way, two ejectors may be provided to generate vacuum during higher boost conditions, via the second ejector positioned in the compressor flow path, and to generate vacuum during low or no boost conditions, via the first ejector positioned across the engine throttle. The flow through the ejectors may be controlled by separate motive flow control valves, in one example, which are actuated via a common actuator. In doing so, vacuum may be generated under a wide variety of operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Wastegates may provide boost control by bypassing exhaust around a turbine. To provide wastegate actuation under a variety of engine conditions, the boost pressure acting as a wastegate control signal may also be used to generate vacuum to actuate the wastegate. An ejector positioned in either the compressor or the turbine bypass flow may generate vacuum that is directed to the wastegate actuator. Alternatively, the ejector may be placed between other suitable pressure differences in the exhaust conduit, the air conduit, or a combination of both. Thus, when excess boost is available for vacuum generation via the ejector, the wastegate is opened. To provide for a variable boost limit, a vent valve may be present to vent some or the entire vacuum away from the actuator. Further, to actuate the wastegate under low or no boost conditions, the actuator may be provided with intake manifold vacuum, supplied directly from the intake manifold or produced from an ejector coupled across the throttle. In this way, the wastegate may be vacuum-actuated under both high and low boost conditions.

Figure 1:
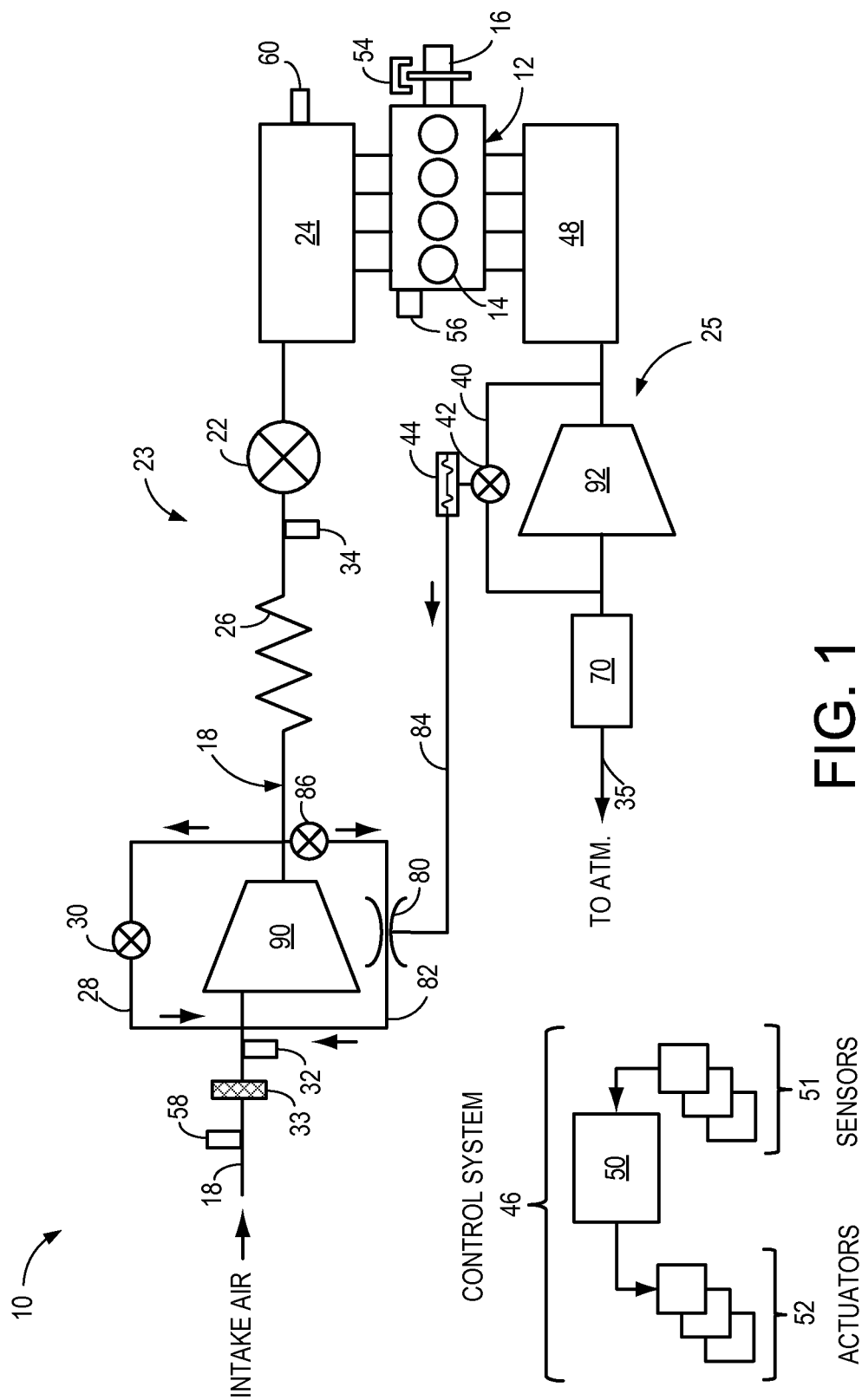
FIG. 1 shows a schematic diagram of an engine including an ejector providing vacuum to a wastegate actuator according to an embodiment of the present disclosure.
Figure 2:
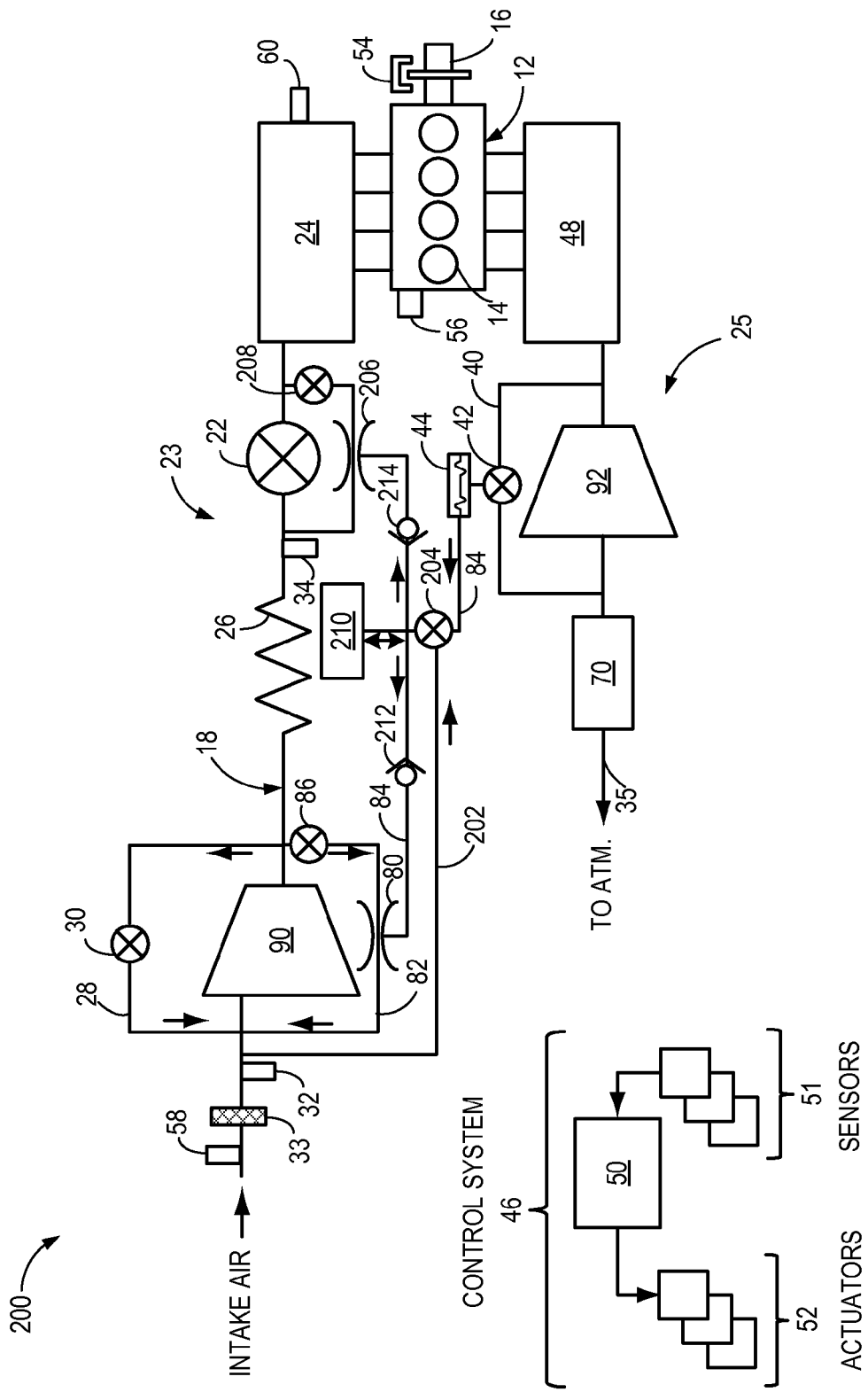
FIG. 2 shows the engine of FIG. 1 with additional wastegate actuation mechanisms.
Figure 3:
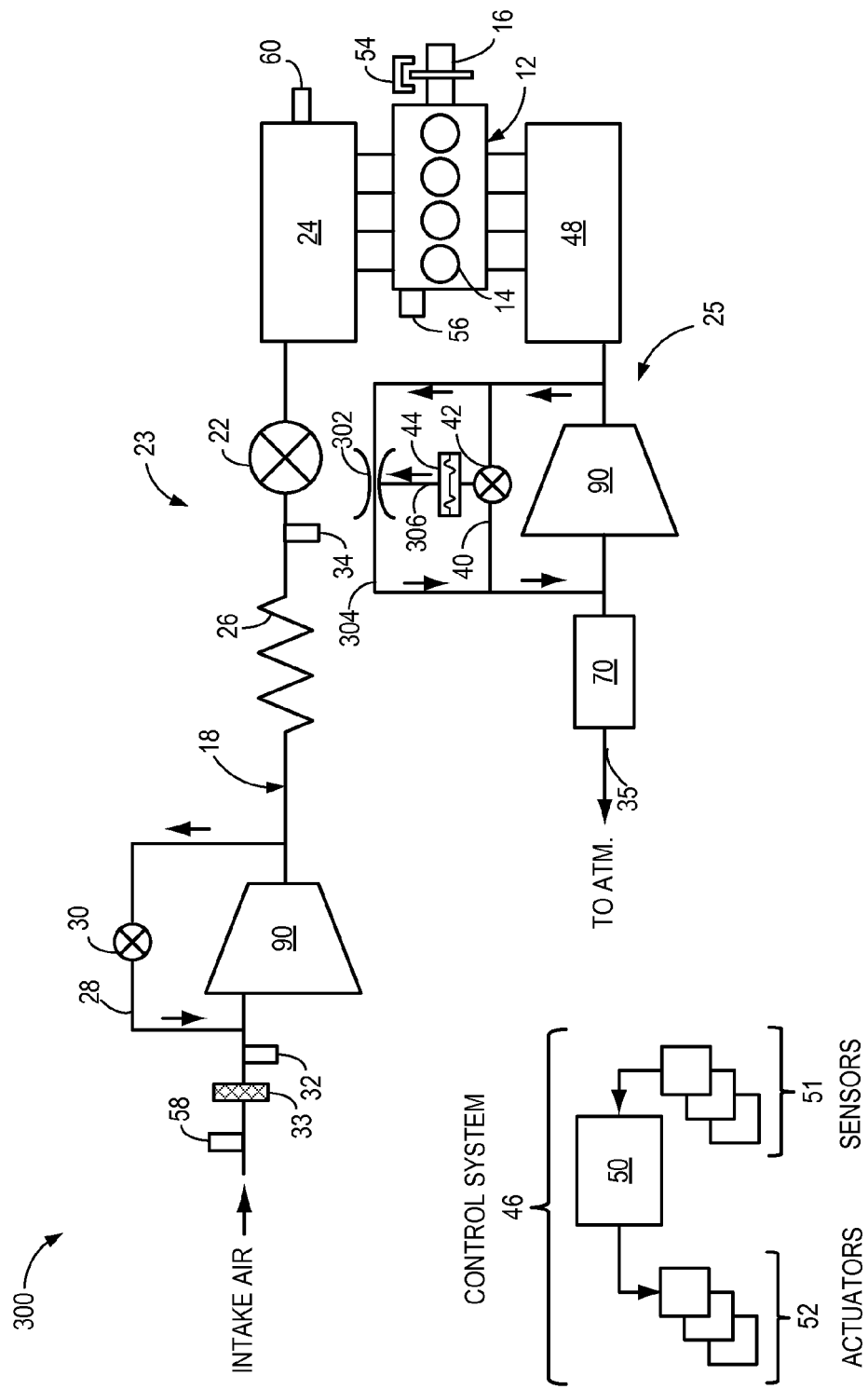
FIG. 3 shows a schematic diagram of an engine including an ejector providing vacuum to a wastegate actuator according to another embodiment of the present disclosure.
Figure 4:
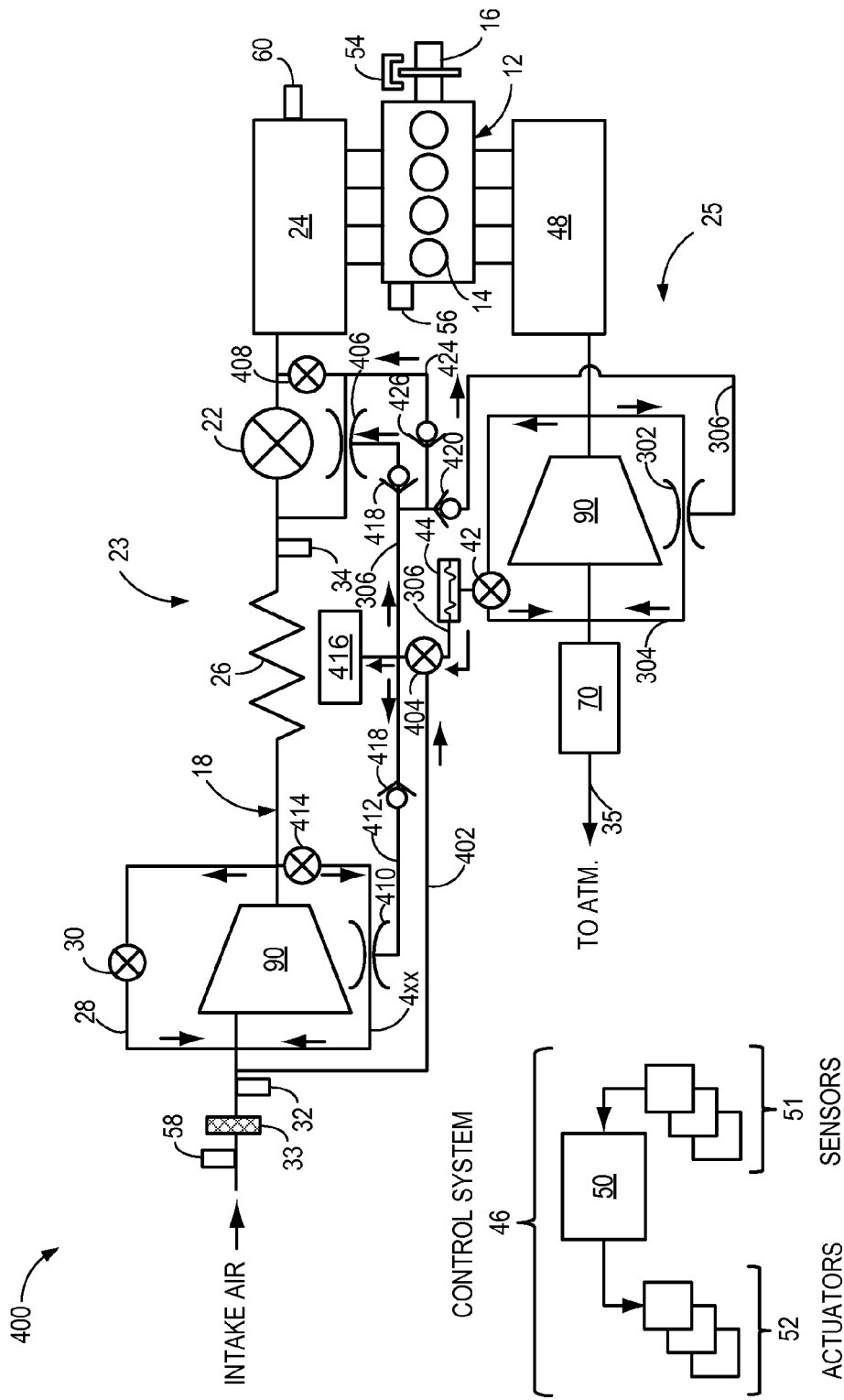
FIG. 4 shows the engine of FIG. 3 with additional wastegate actuation mechanisms.
Figure 5:
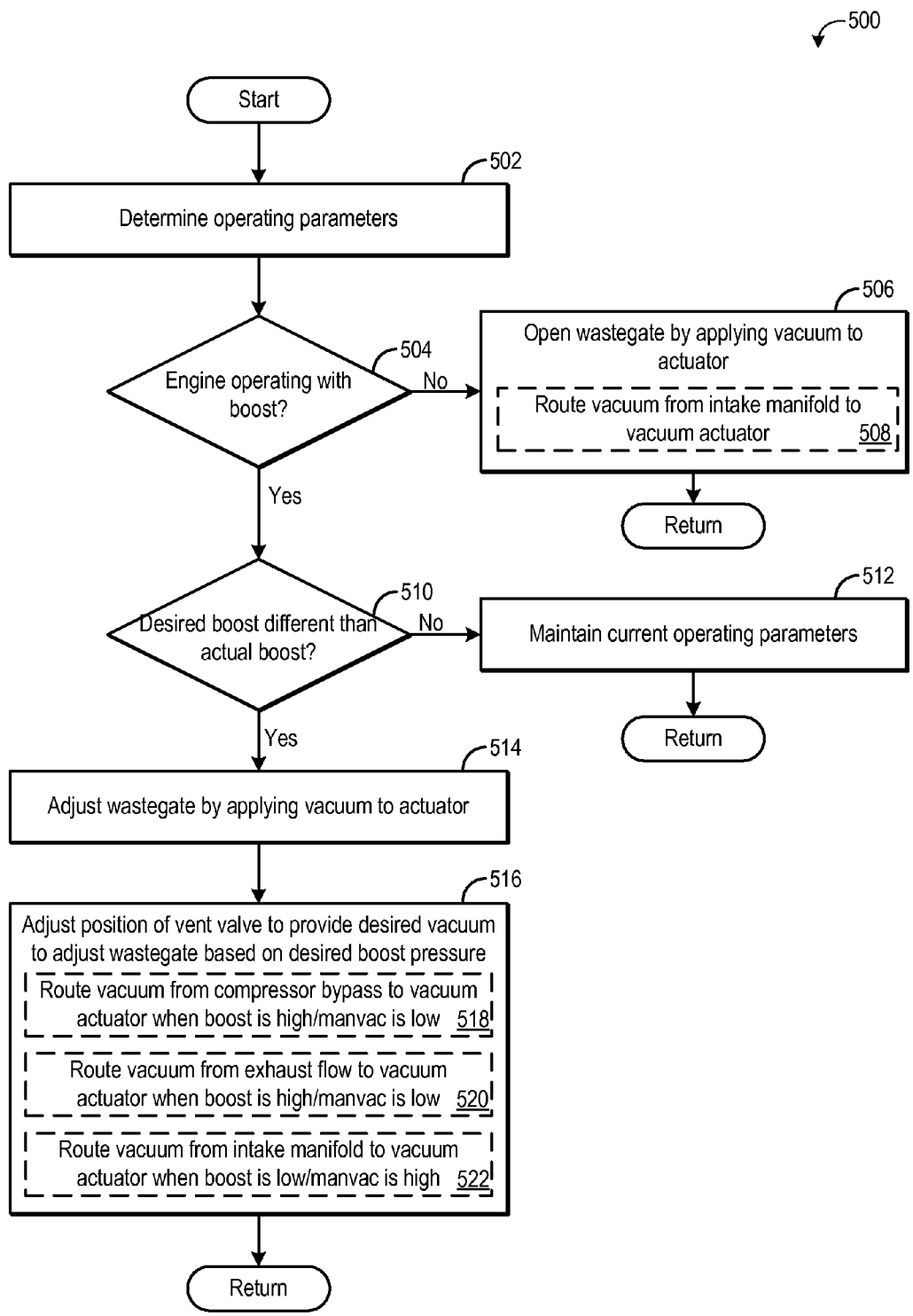
FIG. 5 is a flow diagram illustrating a method for generating vacuum according to an embodiment of the present disclosure.

FIGS. 1 and 2 are engine diagrams illustrating wastegate actuation with vacuum generated from a boost ejector coupled across a compressor. FIGS. 3 and 4 are engine diagrams illustrating wastegate actuation with vacuum generated from a boost ejector coupled across a turbine. FIG. 5 is a flow chart illustrating a method for generating vacuum with the system illustrated in FIG. 2 or FIG. 4.

To provide efficient control of the vacuum generation, the boost ejector's motive flow (e.g., ejector coupled across the compressor or turbine) may be controlled by a motive flow control valve in coordination with a motive flow control valve controlling the throttle ejector's motive flow. The two motive flow control valves may be actuated by a single actuator. Further, the motive flow control valve controlling the ejector coupled across the compressor may act as a surge margin valve under some conditions, reducing the compressor bypass valve and helping to reduce compressor surge.

Figure 6:
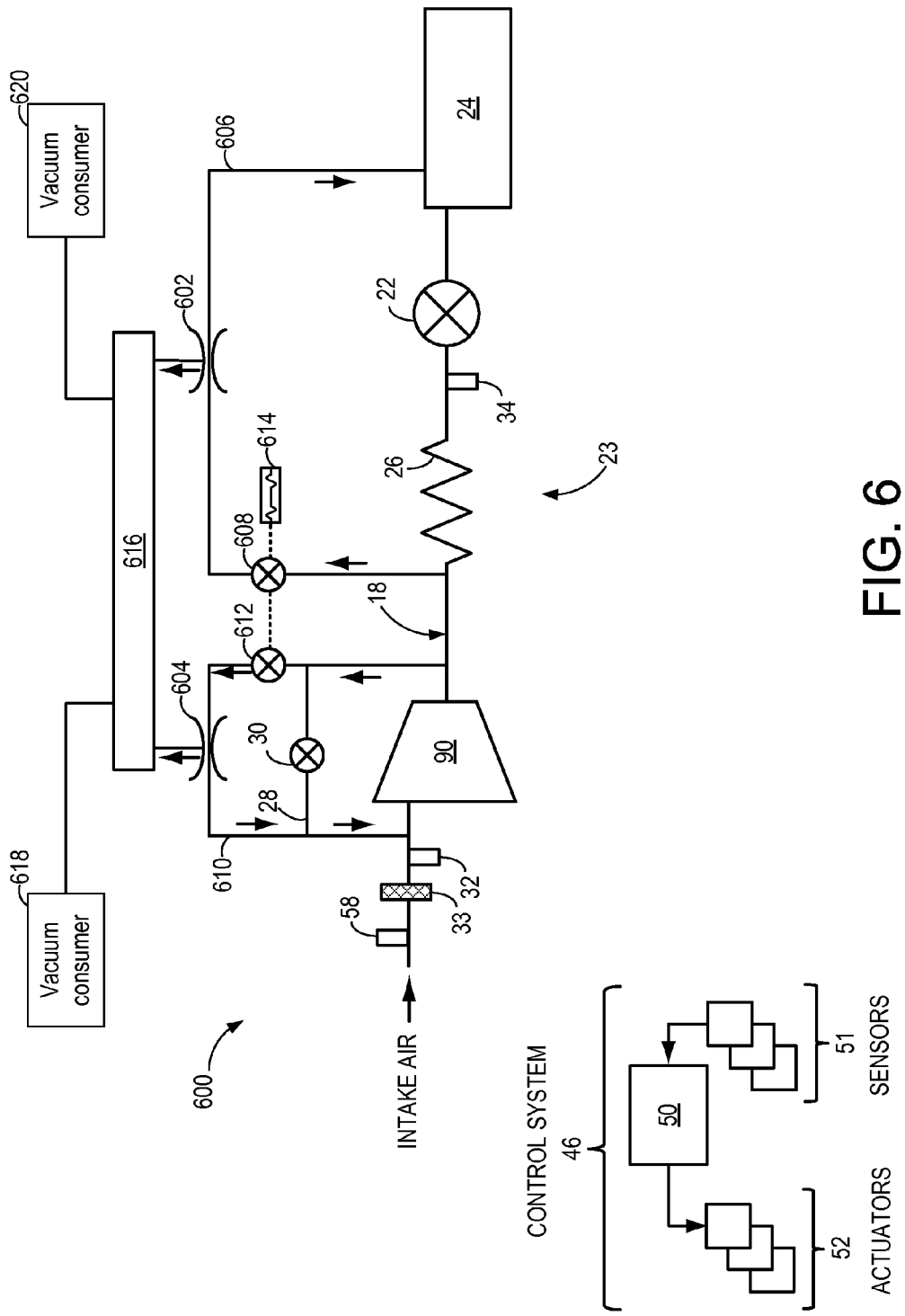
FIGS. 6 and 7 are schematic diagrams of an engine with dual ejector motive flow control provided by a single actuator according to embodiments of the present disclosure.
Figure 7:
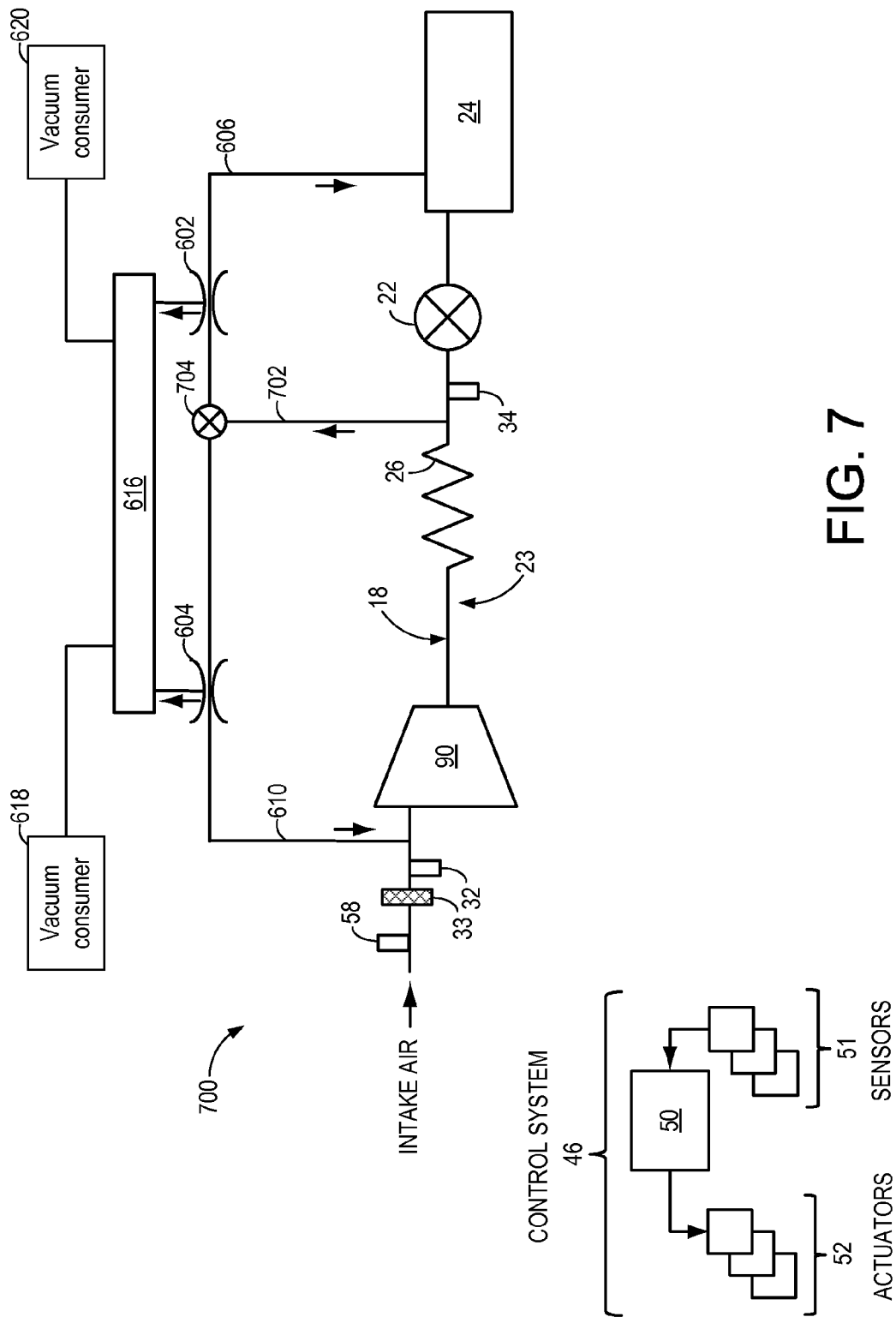
Figure 8:
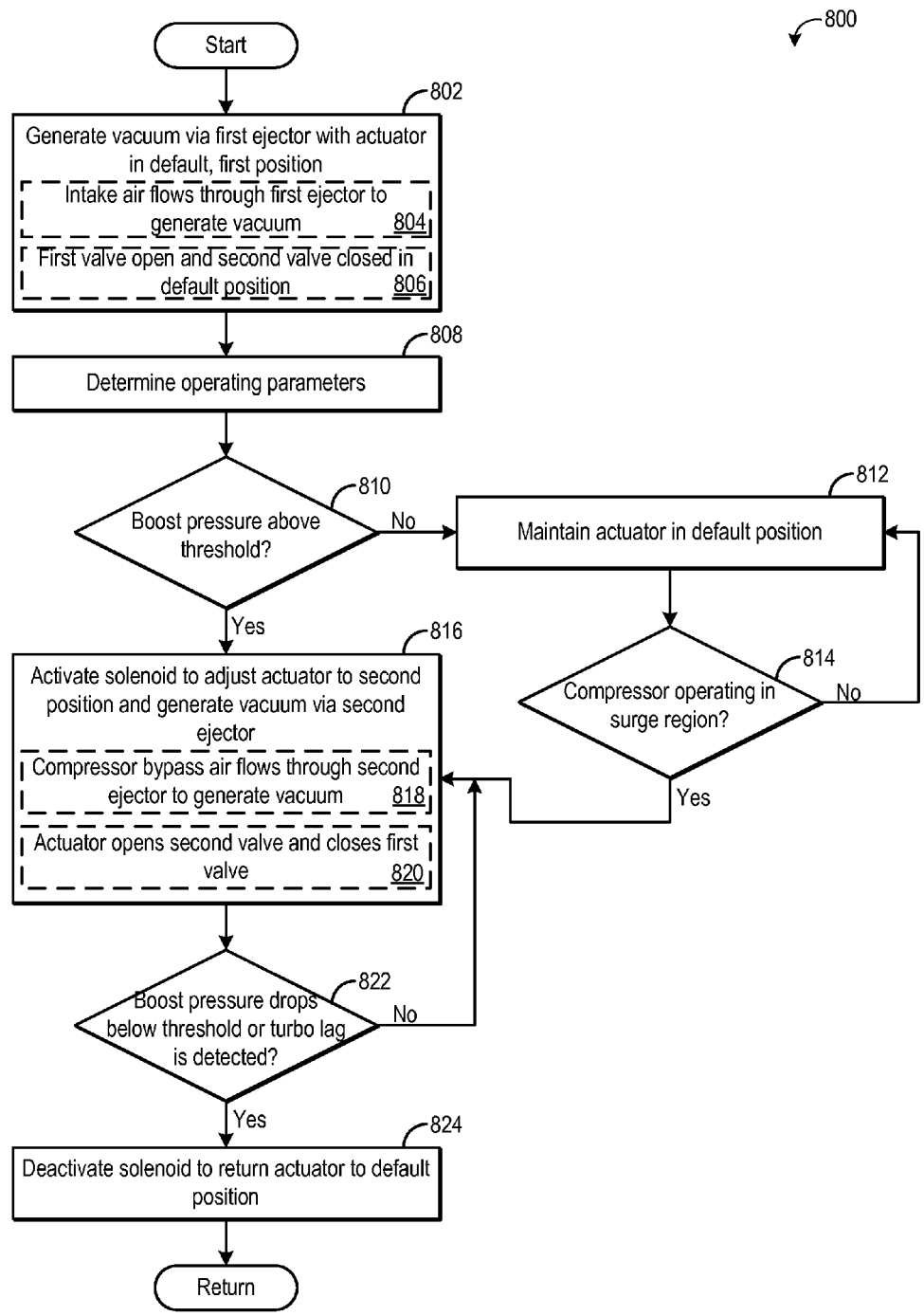
FIG. 8 is a flow diagram illustrating a method for controlling motive flow through multiple ejectors with one actuator according to an embodiment of the present disclosure.
Figure 9:
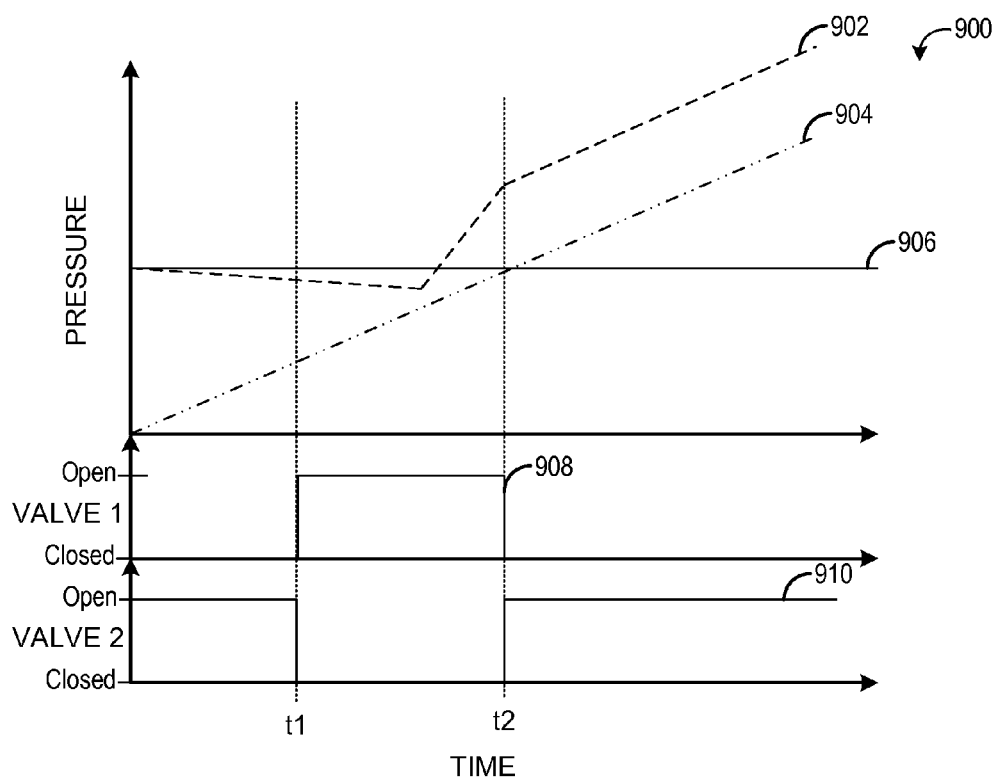
FIGS. 9 and 10 illustrate various engine operating parameters with coordinated control of the dual ejector motive control with the single actuator.
Figure 10:
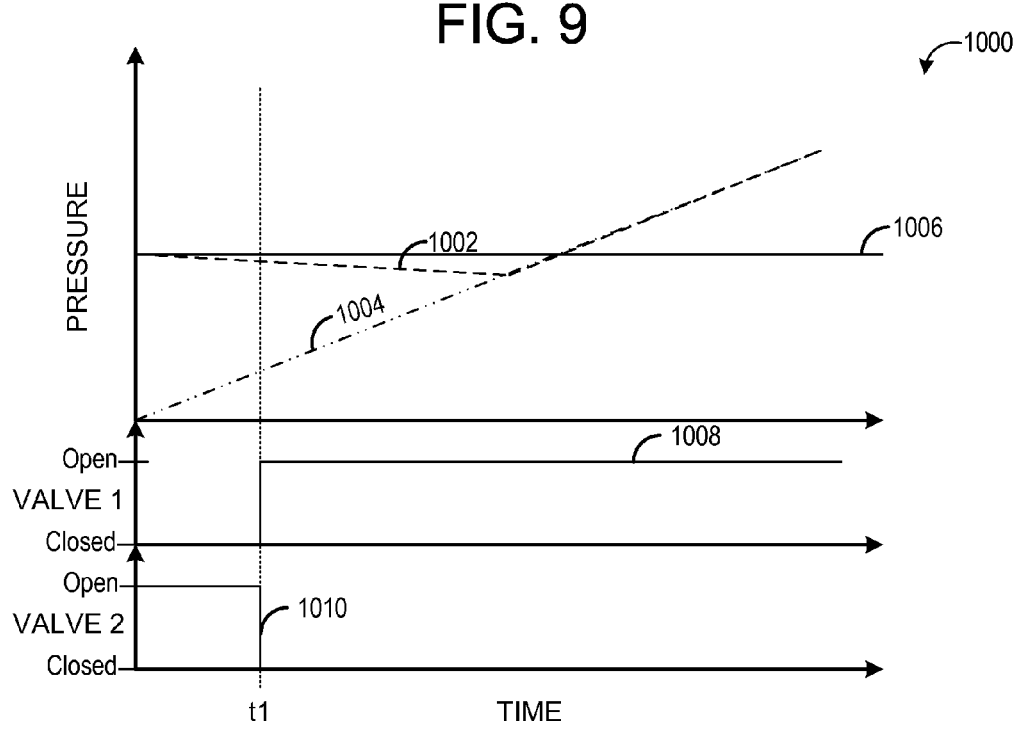

FIGS. 6 and 7 are engine diagrams illustrating control of two ejectors by a single actuator. FIG. 8 is a flow chart illustrating a method for generating vacuum with the system illustrated in FIGS. 6 and 7. FIGS. 9 and 10 illustrate various engine operating parameters during vacuum generation with the two ejectors controlled by a single actuator.

FIG. 1 shows an example engine system 10 including an engine 12. In the present example, engine 12 is a spark-ignition engine of a vehicle, the engine including a plurality of cylinders 14, each cylinder including a piston. Combustion events in each cylinder 14 drive the pistons which in turn rotate crankshaft 16, as is well known to those of skill in the art. Further, engine 12 may include a plurality of engine valves, the valves coupled to the cylinders 14 and controlling the intake and exhaust of gases in the plurality of cylinders 14.

Engine 12 includes an engine intake 23 and an engine exhaust 25. Engine intake 23 includes an air intake throttle 22 fluidly coupled to an engine intake manifold 24 along an intake passage 18. Air may enter intake passage 18 from an air intake system (AIS) including an air cleaner 33 in communication with the vehicle's environment. A position of throttle 22 may be varied by a controller 50 via a signal provided to an electric motor or actuator included with the throttle 22, a configuration that is commonly referred to as electronic throttle control (ETC). In this manner, the throttle 22 may be operated to vary the intake air provided to the intake manifold and the plurality of cylinders 14. The intake 23 may include a mass air flow sensor 58 (in intake passage 18) and a manifold air pressure sensor 60 (in intake manifold 24) for providing respective signals MAF and MAP to the controller 50.

Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine system 10 is a boosted engine system, where the engine system further includes a boosting device. In the present example, intake passage 18 includes a compressor 90 for boosting an intake aircharge received along intake passage 18. A charge air cooler 26 (or intercooler) is coupled downstream of compressor 90 for cooling the boosted aircharge before delivery to the intake manifold. In embodiments where the boosting device is a turbocharger, compressor 90 may be coupled to, and driven by a turbine 92 in the engine exhaust 25 of engine system 10. Further compressor 90 may be, at least in part, driven by an electric motor or crankshaft 16.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This enables boost control and surge control.

Similarly, an optional bypass passage 40 may be coupled across turbine 92 so to divert at least a portion of exhaust around turbine 92, thus controlling turbine speed and hence boost pressure provided to the engine. The amount of exhaust diverted around turbine 92 may be controlled by opening a wastegate 42 located in bypass passage 40. Wastegate 42 may be moved via a wastegate actuator 44, which may be a solenoid actuator, hydraulic actuator, or in the depicted example, a vacuum-driven actuator.

In order to generate vacuum to drive wastegate actuator 44, an ejector 80 may be positioned in the compressor bypass flow. As shown, ejector 80 is positioned in a separate bypass passage 82 around compressor 90, in parallel with bypass passage 28. However, in some embodiments ejector 80 may be located in bypass passage 28. High-pressure intake air from the outlet of the compressor may flow through ejector 80 (air flow through the passages and conduits of FIG. 1 is generally depicted by arrows) and back to the lower-pressure region of the compressor inlet. Vacuum generated by ejector 80 may be routed to wastegate actuator 44 via conduit 84.

Ejector 80 may be an ejector, injector, aspirator, eductor, venturi, jet pump, or similar passive device. Ejector 80 may have an upstream motive flow inlet via which air enters the ejector, a throat or entraining inlet fluidically communicating with wastegate actuator 44 via conduit 84, and a mixed flow outlet via which air that has passed through ejector 80 can exit and be directed to a low-pressure sink, such as intake passage 18 upstream of compressor 90 (e.g., it may be directed to the inlet of compressor 90). Air flowing through the motive inlet may create a low pressure in the ejector 80, thereby creating a low pressure communicated to the throat (or entraining inlet) and drawing a vacuum at the throat. The vacuum at the throat of the ejector draws air from conduit 84, thus providing vacuum to wastegate actuator 44. To control air flow through ejector 80, an optional motive flow control valve 86 may be located in bypass passage 82, upstream, downstream, or midstream of the ejector motive flow. Additionally, an optional check valve may allow wastegate actuator 44 to retain any of its vacuum should the pressures in the ejector's motive inlet and the vacuum actuator equalize. Such a check valve may utilize further venting valves to prevent the wastegate from opening permanently. In the present example, the ejector is a three port device including a motive inlet, a mixed flow outlet, and a throat/entraining inlet. However, in alternate embodiments of the ejector, a check valve may be integrated into the ejector.

Engine system 10 may also include a control system 46 including a controller 50, sensors 51 and actuators 52. Example sensors include engine speed sensor 54, engine coolant temperature sensor 56, a mass air flow sensor 58, manifold air pressure sensor 60, compressor inlet pressure sensor 32, and throttle inlet pressure sensor 34. Example actuators include CBV 30, ejector motive flow control valve 86, throttle 22, and engine valves, fuel injectors, and other components not illustrated in FIG. 1. Controller 50 may further include a physical memory with instructions, programs and/or code for operating the engine. Example routines executed by controller 50 are shown at FIGS. 5 and 8.

Thus, the system of FIG. 1 provides for a vacuum-actuated wastegate valve to control boost pressure by adjusting the amount of exhaust that bypasses a turbocharger turbine. The wastegate actuator may receive vacuum generated by flowing air through an ejector coupled across a compressor of the turbine. In this way, the wastegate valve may be opened based on the level of provided boost (e.g., the amount of air that is bypassed around the compressor and through the ejector), as the amount of vacuum supplied to the wastegate actuator increases as throttle inlet pressure (e.g., boost) increases. However, additional control of the wastegate actuator may be desired. For example, it may be desired to open the wastegate valve under conditions of low or no boost, in order to increase fuel economy. Additionally, it may be desired to actively control the amount of boost pressure with the wastegate actuator, by selectively supplying vacuum to the wastegate actuator. FIG. 2 illustrates an engine system 200 including the features of FIG. 1 plus additional, optional components to provide boost control and wastegate actuation under low boost conditions.

Engine system 200 includes similar features as engine system 10, including the engine 12, compressor 90, turbine 92, ejector 80 supplying vacuum to wastegate actuator 44, and other components previously described. Conduit 84, which supplies vacuum from ejector to wastegate actuator 44, is depicted in FIG. 2 as running the entire length from ejector 80 down to actuator 44. In order to provide active boost control via actuation of wastegate 42, a vent line 202 may be present in order to couple conduit 84 to the intake passage 18 upstream of compressor 90. A vent valve 204 may be positioned in vent line 202 or at the intersection of vent line 202 and conduit 84. Vent valve 204 may be controlled by controller 50 to adjust the amount of vacuum supplied to wastegate actuator 44, with excess vacuum being routed back to the intake via the vent line 202. Thus, by controlling vent valve 204, active boost pressure control may be provided.

In order to open wastegate 42 under conditions of little or no boost (e.g., when sufficient vacuum is not generated via ejector 80), vacuum may be routed to wastegate actuator 44 from the intake passage or the intake manifold 24. To provide intake manifold vacuum, a second ejector 206 may be coupled across the throttle 22. Second ejector 206 may generate vacuum from motive flow of intake air from upstream of the throttle to downstream of the throttle. The vacuum generated by second ejector 206 may be routed to conduit 84 and/or through vent valve 204. Control of flow through second ejector 206 may be provided by ejector motive flow control valve 208, which may be positioned either upstream or downstream of second ejector 206.

Wastegate actuator vacuum may be controllable by either the motive flow valve (e.g. 86, 208) or from vent valve 204, which either applies vacuum or venting of vacuum.

A vacuum reservoir 210 may be fluidically coupled to both ejector 80 and second ejector 206 and to wastegate actuator 44. As depicted in FIG. 2, a conduit from reservoir 210 as well as a conduit from second ejector 206 intersect with and are fluidically coupled to conduit 84. Thus, vacuum from both reservoir 210 and second ejector 206 may be routed to wastegate actuator 44. In this way, vacuum may be stored in reservoir 210 and applied to wastegate actuator 44 if the pressure drop across ejector 80 and/or second ejector 206 is not sufficient to control the position of wastegate 42. Additionally, a first check valve 212 and second check valve 214 may prevent depletion of vacuum from reservoir 210 and/or ensure vacuum only flows from ejector 80 or second ejector 206 to wastegate actuator 44 and not the other direction. Similar to FIG. 1, air flow though the various conduits and passageways of engine system 200 are depicted by the arrows of FIG. 2.

The configuration depicted in FIG. 2 is not limiting, as other configurations are possible. For example, reservoir 210 may be dispensed with. Similarly, second ejector 206 may be dispensed with, and vacuum from intake manifold 24 may be supplied to conduit 84 and wastegate actuator 44 via a direct supply line coupled to the intake passage 18 downstream of throttle 22. Further, while FIGS. 1 and 2 depict vacuum generated from the ejector in the compressor flow path and/or vacuum from the intake manifold being directed to a wastegate actuator, other vacuum consumers may receive the vacuum in addition to or alternatively of the wastegate actuator. Example vacuum consumers include a brake booster for the vehicle braking system, charge motion control valve, fuel vapor canister (in order to provide vacuum for purging fuel vapors from the canister), and other vacuum-consuming devices.

Thus, the systems of FIGS. 1 and 2 provide for a system for an engine, comprising a compressor coupled to a turbine; an ejector positioned in a bypass path of the compressor; a wastegate valve of the turbine actuated by a vacuum actuator; and a vacuum conduit coupling the ejector to the vacuum actuator. The system may include a vent line coupling the vacuum conduit to an intake passage upstream of the compressor. A vent valve may be positioned in the vent line, and the system may include a controller including instructions to adjust the vent valve based on desired boost pressure.

The system may include a second ejector positioned across a throttle and fluidically coupled to the vacuum conduit. A valve may be positioned in the bypass path of the compressor. In one example of the system, a controller may include instructions to open the valve based on mass air flow and compressor pressure ratio. In another example, the controller may include instructions to open the valve based on desired boost pressure. A compressor bypass valve may be positioned parallel to the ejector.

FIG. 3 shows another embodiment of a system for actuating a wastegate valve with a vacuum-driven actuator. The system illustrated in FIG. 3 uses vacuum generated from an engine exhaust to control a wastegate actuator, rather than vacuum generated from compressor bypass flow as in the systems of FIGS. 1 and 2. FIG. 3 illustrates an engine system 300. Engine system 300 is similar to engine systems 10 and 200, in that it includes an engine 12, compressor 90, turbine 92, wastegate 42, and wastegate actuator 44, as well as other components previously described. In engine system 300, wastegate actuator 44 is supplied vacuum by ejector 302 positioned in an exhaust flow path. As shown, ejector 302 is positioned in a bypass passage 304 that is parallel to bypass passage 40. However, ejector 302 may be positioned in bypass passage 40 in some embodiments. Thus, ejector 302 receives exhaust flowing from the engine 12 and outlets the exhaust to the exhaust passage 35 downstream of the turbine 92. The vacuum generated by ejector 302 is routed to wastegate actuator 44 via conduit 306. Thus, as the exhaust flow from the engine increases, increasing turbine speed and thus boost pressure, the amount of vacuum supplied by the ejector 302 to the wastegate actuator 44 also increases.

In this way, exhaust pressure may be used as the actuating pressure without placing the wastegate actuator in the exhaust flow path, where it would be subject to high heat, thus compromising the diaphragm and/or pneumatic hose of the actuator. In the configuration illustrated in FIG. 3, the boost pressure provides both the signal to open the wastegate as well as the mechanism for generating the vacuum to open the wastegate.

While the ejector in FIG. 3 is shown be coupled across the turbine with the turbine inlet acting as the high-pressure source to the ejector and the turbine outlet acting the low-pressure sink, other configurations are possible. For example, the ejector may receive high-pressure air from the turbine inlet and release air to the compressor inlet. In another example, the ejector may receive air from the turbine outlet and release air to downstream of the catalyst or to the compressor inlet.

In order to provide controllability of the wastegate actuation, a vent valve may be interposed between wastegate actuator 44 and ejector 302. In a "vacuum" position, the valve may apply the full vacuum of ejector 302. In the "vent" position, the valve may put atmospheric pressure on each side of the vacuum actuator 44. The vent valve may always vent some flow in any position except full vacuum. In other examples, that the vent valve may include three modes: increase vacuum, vent vacuum away, and hold current vacuum. In any case, this valve allows control via the controller instead of strictly via pneumatic-mechanical adjustments.

FIG. 4 illustrates the vacuum-generation system of FIG. 3 with optional active boost control and wastegate actuation at low or no boost conditions. FIG. 4 illustrates an example engine system 400 that includes the wastegate actuator 44 and ejector 302 of FIG. 3, among other components already described. Conduit 306, which couples ejector 302 to wastegate actuator 44, runs the entire length from ejector 302 to wastegate actuator 44, with additional lines and conduits explained below intersecting with and coupled to conduit 306.

Reservoir 416 may be provided vacuum by four separate sources: ejectors 302, 410, 406, and the intake manifold. Other ejector based sources are also possible.

Ejector 302 results in introduction of air into the exhaust stream. This is an advantage in certain cases. One case is during catalyst light off where may function as a secondary air introduction pump. Another case is during rich operation where added air reduces regulated emissions, albeit at the cost of increased catalyst heat.

In order to provide active boost control via actuation of wastegate 42, a vent line 402 may be present in order to couple conduit 306 to the intake passage 18 upstream of compressor 90. A vent valve 404 may be positioned in vent line 402 or at the intersection of vent line 402 and conduit 306. Vent valve 404 may be controlled by controller 50 to adjust the amount of vacuum supplied to wastegate actuator 44, with excess vacuum being routed back to the intake via the vent line 402. Thus, by controlling vent valve 404, active boost pressure control may be provided.

In order to open wastegate 42 under conditions of little or no boost (e.g., when sufficient vacuum is not generated via ejector 302), vacuum may be routed to wastegate actuator 44 from the intake manifold 24. To provide intake manifold vacuum, a second ejector 406 may be coupled across the throttle 22. Second ejector 406 may generate vacuum from motive flow of intake air from upstream of the throttle to downstream of the throttle. The vacuum generated by second ejector 406 may be routed to conduit 306 and/or through vent valve 404. Control of flow through second ejector 406 may be provided by ejector motive flow control valve 408.

In some embodiments, a third ejector 410 may be present in the compressor bypass flow passage, similar to the ejector 80 described above with respect to FIGS. 1 and 2. Vacuum from third ejector 410 may be routed to conduit 306 via conduit 412. To control airflow through third ejector 410, an ejector motive flow control valve 414 may be present in the bypass passage housing third ejector 410.

A vacuum reservoir 416 may be fluidically coupled to ejector 302, second ejector 406, third ejector 410, and to wastegate actuator 44. As depicted in FIG. 4, a conduit from reservoir 416, conduit 412 from third ejector 410, as well as a conduit from second ejector 406 intersect with and are fluidically coupled to conduit 306. Thus, vacuum from reservoir 416, third ejector 410, and/or second ejector 406 may be routed to wastegate actuator 44. In this way, vacuum may be stored in reservoir 416 and applied to wastegate actuator 44 if the pressure drop across ejector 302, third ejector 410, and/or second ejector 406 is not sufficient to control the position of wastegate 42. Additionally, a first check valve 418, second check valve 420, and third check valve 422 may prevent depletion of vacuum from reservoir 416 and/or ensure vacuum only flows from ejector 302, second ejector 406, or third ejector 410 to wastegate actuator 44 and not the other direction. Similar to previous figures, air flow though the various conduits and passageways of engine system 400 are depicted by the arrows of FIG. 3.

Under conditions of high intake manifold vacuum, flow air through second ejector 406 may not be needed to generate sufficient vacuum to actuate wastegate 42. Thus, a direct passage 424 may couple intake passage 18 upstream of intake manifold 24 to conduit 306. A fourth check valve 426 may be present in direct passage 424.

The configuration depicted in FIG. 4 is not limiting, as other configurations are possible. For example, reservoir 416 may be dispensed with. Similarly, second ejector 406 and/or third ejector 410 may be dispensed with. Further, while FIGS. 3 and 4 depict vacuum generated from the ejector in the exhaust flow path and/or vacuum from the intake manifold being directed to a wastegate actuator, other vacuum consumers may receive the vacuum in addition to or alternatively of the wastegate actuator. Example vacuum consumers include a brake booster for the vehicle braking system, charge motion control valve, fuel vapor canister (in order to provide vacuum for purging fuel vapors from the canister), and other vacuum-consuming devices.

The systems illustrated in FIGS. 3 and 4 provide for a system for an engine, comprising a compressor positioned in an intake of the engine and coupled to a turbine positioned in an exhaust of the engine; an ejector positioned in an exhaust flow path; a wastegate valve of the turbine actuated by a vacuum actuator; and a vacuum conduit coupling the ejector to the vacuum actuator. An inlet of the ejector may be positioned in the exhaust flow path upstream of the turbine and an outlet of the ejector may be positioned in the exhaust flow path downstream of the turbine. In other examples, the ejector inlet may be positioned in the exhaust upstream of the turbine and the ejector outlet may be positioned in an intake upstream of the compressor.

The system may further comprise a vent line coupling the vacuum conduit to an intake passage upstream of the compressor. A vent valve may be positioned in the vent line, and a controller may include instructions to adjust the vent valve based on desired boost pressure. The system may include a second ejector positioned across a throttle and fluidically coupled to the vacuum conduit. A third ejector may be positioned across the compressor and fluidically coupled to the vacuum conduit.

Thus, the systems provided in FIGS. 1 and 2 provide for actuating a wastegate with vacuum generated by an ejector positioned in a compressor bypass flow path, while the systems of FIGS. 3 and 4 provide for actuating the wastegate with vacuum generated by an ejector positioned in an exhaust flow path. Each wastegate actuation system may include a vent line and vent valve controllable by the controller to supply a selected amount of vacuum to the actuator, thus providing boost control. Further, each actuation system may include an additional vacuum source, originating from intake manifold vacuum, to supply vacuum to the actuator during low or no boost conditions.

FIG. 5 illustrates a method 500 for supplying vacuum to a vacuum actuator, such as wastegate actuator 44 of FIGS. 1-4. Method 500 may be carried out by controller 50 according to instructions stored thereon. Method 500 comprises, at 502, determining operating parameters. Operating parameters may include engine speed and load, boost pressure (as determined by compressor inlet pressure (CIP), throttle inlet pressure (TIP), and/or MAP), and other parameters. At 504, it is determined if the engine is operating with boost (e.g., MAP greater than barometric pressure). If the engine is not operating with boost, which may occur during light load operation for example, method 500 proceeds to 506 to open a wastegate positioned across a turbocharger turbine by applying vacuum to the wastegate actuator. As indicated at 508, the vacuum may be routed from the intake manifold to the wastegate actuator, for example by opening valve 208 of FIG. 2 or opening valve 408 of FIG. 4. The vacuum may be supplied directly from the intake manifold (or intake passage upstream of the manifold and downstream of the throttle), or it may be generated by flowing the intake air through an ejector coupled across the throttle. However, in some examples, vacuum may be routed from a vacuum reservoir instead of the intake manifold. By opening the wastegate even in unboosted conditions, pumping losses through the turbine may be reduced, thus increasing fuel economy. Method 500 then returns.

If it is determined at 504 that the engine is operating with boost, method 500 proceeds to 510 to determine if a desired amount of boost is different than a provided amount of boost. The desired amount of boost may be based on engine speed and load, in one example. If the desired amount of boost and provided amount of boost are not different, no adjustments to the current wastegate position are indicated, and thus method 500 proceeds to 512 to maintain current operating parameters (e.g., maintain current wastegate position), and then method 500 returns.

Returning to 510, if the desired amount of boost and the provided amount of boost are different, method 500 proceeds to 514 to adjust the wastegate position by applying vacuum to the wastegate actuator. To apply the vacuum, at 516, a position of the vent valve may be adjusted to provide a desired amount of vacuum to the wastegate actuator to adjust the wastegate position. The desired amount of vacuum may be based on the desired boost pressure. Depending on the configuration of the actuation system, the vacuum may be supplied to the wastegate actuator from various sources. As indicated at 518, vacuum may be routed from the compressor bypass flow path to the actuator when boost is relatively high and/or intake manifold vacuum is relatively low. Further, in some examples, the ejector motive flow control valve in the compressor bypass flow may be opened to provide the motive flow through the ejector to generate the vacuum. If the ejector is positioned in the compressor bypass flow, as illustrated in FIGS. 1 and 2, vacuum may be generated by the ejector when boost is above a threshold. The threshold amount of boost may be no boost, so that vacuum is supplied to the actuator any time boost is available. In other embodiments, the threshold may be the desired amount of boost, and if excess boost is available above the desired amount, then vacuum may be generated by the ejector and supplied to the actuator. In still other embodiments, the threshold may be fixed amount of boost that provides enough vacuum generation to actuate the wastegate. Generation of vacuum through the compressor bypass ejector may be actively controlled by opening valve 86, or it may occur passively when provided boost is higher than desired boost. Further, the wastegate position may be selected in order to maintain some excess boost for generating the vacuum. However, in other examples, the wastegate position may be selected to bring the provided boost to the level of the desired boost, even if excess boost is subsequently not available for vacuum generation.

If the ejector is positioned in the exhaust flow, as illustrated in FIGS. 3 and 4, vacuum may be routed from the exhaust flow to the actuator when boost is high and/or manifold vacuum is low, as indicated at 520. The conditions for routing vacuum from the exhaust flow may be similar to those for routing vacuum from the compressor bypass flow, in that a sufficient amount of boost needs to available to generate the vacuum. Further, in some examples, the ejector motive flow control valve in the exhaust flow path may be opened to provide the motive flow through the ejector to generate the vacuum.

If boost pressure is too low to generate sufficient vacuum (for both the compressor bypass ejector and the exhaust ejector), and if manifold vacuum is high, vacuum may be routed from the intake manifold to the actuator, as indicated at 522. The routing of vacuum from the intake manifold may be similar to that described above at 506 and 508. However, in some embodiments, vacuum may be routed from a vacuum reservoir instead of the intake manifold.

Thus, method 500 of FIG. 5 provides for actuating a wastegate using a vacuum actuator during both higher boost and lower boost conditions. In one example, a method for an engine including a turbocharger having a compressor driven by a turbine comprises generating vacuum via compressor bypass flow through an ejector, and applying vacuum from the ejector to a wastegate actuator. Another method for an engine including a turbocharger having a compressor driven by a turbine comprises generating vacuum via exhaust flow through an ejector, and applying vacuum from the ejector to a wastegate actuator.

For both the methods, the wastegate actuator may be configured to adjust a wastegate valve of the turbine. The vacuum from the ejector to the wastegate actuator may be supplied via a conduit fluidically coupling the ejector to the wastegate actuator, and a vent line may fluidically couple the conduit to an intake passage upstream of the compressor.

The methods may further comprise adjusting boost pressure by adjusting a valve positioned in the vent line. The methods may also comprise applying vacuum from an intake manifold of the engine to the wastegate actuator. Applying vacuum from the intake manifold of the engine to the wastegate actuator may further comprise generating vacuum via a second ejector positioned in an intake flow path. The methods may include storing vacuum generated by the ejector and/or the second ejector in a vacuum reservoir.

In another example, a method for an engine including a turbocharger having a compressor driven by a turbine comprises during a first condition, adjusting a wastegate valve of the turbine via a vacuum actuator with vacuum received from an ejector positioned in a compressor bypass flow pathway, and during a second condition, adjusting the wastegate valve via the vacuum actuator with vacuum received from an intake manifold of the engine. An additional method for an engine including a turbocharger having a compressor driven by a turbine comprises during a first condition, adjusting a wastegate valve of the turbine via a vacuum actuator with vacuum received from an ejector positioned in an exhaust flow pathway, and during a second condition, adjusting the wastegate valve via the vacuum actuator with vacuum received from an intake manifold of the engine.

For the methods, the first condition may comprise boost pressure above a threshold and the second condition may comprise boost pressure below the threshold. In another example of the methods, the first condition may comprise intake manifold vacuum below a threshold and the second condition may comprise intake manifold vacuum above the threshold.

The methods may further comprise adjusting boost pressure by adjusting a vent valve positioned in a vent line fluidically coupling the ejector to an intake passage upstream of the compressor. Adjusting the wastegate valve via the vacuum actuator with vacuum received from the intake manifold may further comprise adjusting the wastegate valve via the vacuum actuator with vacuum received from a second ejector positioned across a throttle of the intake manifold.

A motive flow control valve in the exhaust flow path may be opened to generate vacuum from the ejector, when the ejector is positioned in the exhaust flow path. When the ejector is positioned in the compressor bypass flow path, a motive flow control valve in the compressor bypass flow path may be opened to generate vacuum from the ejector.

Returning briefly to FIG. 2, the two ejectors illustrated in FIG. 2 (ejector 80 and second ejector 206) may receive motive flow that is controlled by two separate valves (motive flow control valve 86 and motive flow control valve 208), each having their own separate actuators to allow for independent control of the motive flow through each ejector. However, such actuators may be expensive. Further, in typical ejector systems, air exiting the ejector is routed to one or more low pressure sinks (e.g., intake manifold) via high-flow check valves, which are also expensive. To eliminate the usage of the high-flow check valves in the motive flow path, multiple ejectors may be used (e.g., one ejector for each low pressure sink), as illustrated in FIG. 2. Additionally, a single actuator may be used to control the position of both motive flow control valves. Such a configuration is illustrated in FIGS. 6 and 7, described below.

FIG. 6 illustrates an engine system 600 including an intake manifold 24, compressor 90, throttle 22, and other components described in the previous figures. Although not shown in FIG. 6, intake manifold 24 is coupled to an engine, similar to the intake manifolds illustrated in FIGS. 1-4. Engine system 600 includes two ejectors, first ejector 602 and second ejector 604. First ejector is positioned in a bypass passage 606 that is coupled to the intake passage across throttle 22; air enters bypass passage from upstream of intercooler 26 (although it may alternatively enter the passage from downstream of intercooler 26 and upstream of throttle), travels though first ejector 602, and exits to the intake manifold 24. A first motive flow control valve 608 is positioned in bypass passage 606.

Second ejector 604 is located in bypass passage 610, which bypasses the compressor 90. Air enters bypass passage 610 from the compressor outlet, travels though second ejector 604, and exits to the compressor inlet. A second motive flow control valve 612 is positioned in bypass passage 610. While FIG. 6 illustrates a separate compressor bypass valve 30 for controlling flow around the compressor, in some embodiments, the compressor bypass valve may be replaced by the second motive flow control valve 612. As discussed previously, compressor bypass valve 30 may provide boost control as well as surge protection. Compressor surge occurs during conditions of high boost pressure (e.g., high pressure ratio across the compressor) and low air flow through the compressor; compressor surge may result in degradation to the turbocharger components in some conditions. Thus, to reduce surge, air from the compressor outlet may be routed back to the compressor inlet via the compressor bypass valve, thus increasing flow through the compressor and reducing surge. Alternatively, cooled, post-charge air cooler air may be circulated around the compressor to improve the surge margin. If compressor bypass valve 30 is dispensed with, second valve 612 may act as a surge margin valve, being opened during surge conditions to provide surge protection. During conditions of turbo spin up, such as during vehicle acceleration, second valve 612 may be closed. By replacing the continuously variable compressor bypass valve with the on/off second valve 612, comprise of the turbo spin up by the "permanent leak" introduced by the continuously variable compressor bypass valve may be reduced.

First valve 608 and second valve 612 may be actuated by a common actuator 614. Actuator 614 may be a solenoid actuator that is activated upon receiving current from controller 50. Actuator 614 may have a default position that is resumes when not activated. In the default position, one of the valves may be closed while the other may be open. In the activated position, the closed valve opens and the open valve closes. For example, with the actuator in the default position, first valve 608 may be open while second valve 612 may be closed. In the activated position, first valve 608 may close while second valve 612 may open. In this way, a single actuator may be used to control the position of multiple flow control valves. FIG. 6 illustrates the valves 608, 612 as inline valves, however other valve configurations are possible. For example, the valves may be gate valves positioned at the throats of the ejectors. Further, the control line between actuator 614 and valve 608 and valve 612 by which actuator 614 adjusts the position of the valves is depicted as a dotted line in FIG. 6.

First ejector 602 and second ejector 604 may each direct vacuum to a vacuum reservoir 616, which may be coupled to one or more vacuum consumers 618 and 620. The vacuum consumers may be suitable devices that utilize vacuum, such as pneumatic actuators (wastegate actuator, CMCV actuator, brake booster, engine mounts, front axle disconnect, HVAC controls, etc.) and/or gas ingestion systems/devices (for ingesting gaseous fuel, crankcase gases, circulated exhaust, and fuel vapors, for example).

While FIG. 6 shows two valves actuated by a single actuator, in some embodiments the two valves may be replaced with a single valve. As shown in FIG. 7, an engine system 700, similar to system 600, includes bypass passages 606 and 610 sharing a common intake line 702 that leads to a valve 704. Valve 704 may be actuated by an actuator to one of two positions. When the actuator is in a first, default position, the valve 704 may be a first position where air from intake line 702 is routed through first ejector 602, while when the actuator is a second, activated position, the valve 704 may be moved into a second position where air is routed from intake line 702 through second ejector 604.

Both FIGS. 6 and 7 depict coordinated control of air flow through two ejectors, such that when air flows through one ejector, it does not flow through the other ejector. Because one ejector receives motive flow during conditions of high boost (second ejector 604), while the other receives motive flow during conditions of high intake manifold vacuum, vacuum generation by the ejectors may be produced during most operating conditions, and may be as effective as when the ejectors are independently controlled.

The systems of FIGS. 6 and 7 provide for a system for an engine comprising a first ejector positioned across a throttle and controlled by a first valve; a second ejector positioned in a compressor bypass flow and controlled by a second valve; and a common actuator configured to simultaneously adjust a position of the first valve and the second valve. The second valve may comprise a continuously variable compressor bypass valve. The system may include controller with instructions to activate the common actuator to open the second valve and close the first valve when boost pressure is above a threshold. The controller may also include instructions to activate the common actuator to open the second valve and close the first valve in response to compressor operation in a surge region, wherein compressor pressure ratio is above a threshold and compressor flow rate is below a threshold. The controller may include instructions to activate the common actuator to close the second valve and open the first valve in response to turbo lag, wherein desired boost to provide engine power demand exceeds provided boost by more than a threshold amount.

Turning now to FIG. 8, a method 800 for generating vacuum with multiple ejectors having separate motive flow control valves actuated by a common actuator is illustrated. Method 800 may be carried out by controller 50 according to instructions stored thereon, in order to generate vacuum in engine system 600 of FIG. 6 or engine system 700 of FIG. 7. Method 800 includes, at 802, generating vacuum via a first ejector with an actuator (e.g., actuator 614) in a default, first position. As explained previously, the actuator may have a default position that the actuator assumes when it is not activated. The first ejector may be positioned in an intake air flow path, across a throttle, such as first ejector 602. As indicated at 804, the intake air flows through the first ejector to generate the vacuum. Further, with the actuator in the first position, a first motive flow control valve (e.g., first valve 608) is open and a second motive flow control valve (e.g., second valve 612) is closed, as indicated at 806. Thus, air flows through the first valve to the first ejector with the actuator in the first position, but does not flow through the second valve to the second ejector.

At 808, engine operating parameters are determined. The determined engine operating parameters may include boost pressure, engine speed and load, MAP, and other parameters. At 810, it is determined if boost pressure is above a threshold. The threshold boost pressure may be no boost, so that any boost is above the threshold. In other embodiments, the threshold may be desired boost, or may be a fixed amount of boost. If boost pressure is above the threshold, method 800 proceeds to 816, which will be explained below. If boost pressure is not above the threshold, method 800 proceeds to 812 to maintain the actuator in the default position, as sufficient boost pressure is not available to generate vacuum with the second ejector.

Method 800 proceeds to 814 to determine if the compressor is currently operating or predicted to operate in a surge region. Compressor surge may result from low air flow through the compressor; under certain conditions, such as a driver tip-out event, the flow rate and pressure ratio across the compressor can fluctuate to levels that may result in noise disturbances, and in more severe cases, performance issues and compressor degradation. To mitigate such surge events, if the second valve has replaced the CBV, it may be opened to increase flow through the compressor. As used herein, the term "surge region" includes compressor operating points that result in surge (beyond a surge level, for example) as well as operating points near a surge level that do not result in surge (but that may push the compressor to surge when small air flow fluctuations occur). Additionally, the compressor may be considered to be operating in the surge region if it is predicted that the compressor would enter surge at or while transitioning to the next requested operating point.

The surge region of the compressor is a function of compressor pressure ratio (e.g., boost pressure) and air flow through the compressor. The pressure ratio and air flow through the compressor may be mapped to a compressor operating map, which indicates if the compressor is operating at surge. Alternatively, compressor operation in the surge region may be determined based on engine speed and load. Further, even if the compressor is not currently operating with surge, subsequent operation with surge may be predicted based on the next requested operating point. For example, if a tip-out event or other drop in engine speed or load has occurred, it may be predicted that the air flow through the compressor is about to decrease, and thus it may be estimated that the compressor is going to operate in the surge region.

If the compressor is not operating in the surge region (or is not predicted to operate in the surge region), method 800 returns to 812 to maintain the default actuator position. If the compressor is operating or predicted to operate in the surge region, method 800 proceeds to 816 to activate the solenoid of the actuator to adjust the actuator to a second position and generate vacuum via a second ejector (e.g., second ejector 604). Additionally, as explained above, if at 810 it is determined that boost pressure is above the threshold, method 800 also proceeds to 816 to activate the solenoid.

With the solenoid activated and the actuator in the second position, compressor bypass air flows through the second ejector to generate the vacuum, as indicated at 818. To flow air through the second ejector, the actuator opens the second valve and closes the first valve, as indicated at 820.

At 822, it is determined if boost pressure drops below the threshold, or if turbo lag is detected. Turbo lag refers to a condition where the amount of provided boost is not sufficient to meet engine power demands, and may occur during a tip-in event or vehicle acceleration. Turbo lag may cause a temporary, undesired lag in engine power that is noticeable to a vehicle operator. To mitigate the turbo lag, all exhaust in the exhaust passage may be routed through the turbine to quickly spin the turbine up to desired speed to produce the requested boost, and all intake air may be routed through the compressor. Thus, if turbo lag is detected (or if it is predicted turbo lag is about to occur) or if boost has dropped below the threshold, method 800 proceeds to 824 to deactivate the solenoid to return the actuator to the default position.

While method 800 of FIG. 8 describes control of two ejectors by two valves with a single actuator, the two ejectors may be alternatively be controlled by a single valve, as illustrated in FIG. 7. In such a configuration, the actuator may move the valve between a first position where the first ejector is used to create vacuum and a second position where the second ejector is used to create vacuum.

FIGS. 9 and 10 illustrate example engine operating conditions with coordinated control of the two ejector motive flow control valves. FIG. 9 illustrates a diagram 900 showing operating conditions during a steady state cruise condition, with a vehicle traveling at constant engine power. Curve 902 illustrates throttle inlet pressure (TIP), curve 904 illustrates MAP, and curve 906 illustrates barometric pressure, with time on the horizontal axis and pressure on the vertical axis. When TIP is above MAP, more efficient vacuum generation may occur with the second ejector, and thus as shown by curve 9010, the second valve is open during a majority of the time illustrated in diagram 900. However, between times t1 and t2, TIP and MAP may become close enough that vacuum generation by the first ejector is preferred, and thus the first valve, illustrated by curve 908, is open during this time. As shown by curves 908 and 910, when the first valve is open, the second valve is closed, and when the first valve is closed, the second valve is open.

FIG. 10 illustrates a diagram 1000 showing the same operating parameters as FIG. 9, during an acceleration event where the engine power demand is at or above provided air flow. TIP is illustrated by curve 1002, MAP is illustrated by curve 1004, BP is illustrated by curve 1006, the first valve position is illustrated by curve 1008, and the second valve position is illustrated by curve 1010. Prior to time t1, TIP is greater than MAP, and thus the second valve may be open with the first valve closed. After time t1, however, TIP is close to or at MAP, and thus the first valve is opened and the second valve is closed.

Thus, the systems and methods described herein provide for a method, comprising when boost is below a threshold, generating vacuum with an actuator in a first position by flowing air from a compressor outlet to an intake manifold through a first ejector, and when boost is above the threshold, generating vacuum with the actuator in a second position by flowing air from the compressor outlet to a compressor inlet through a second ejector. Generating vacuum with the actuator in the first position may further comprise opening a first valve and closing a second valve with the actuator in order to flow air through the first ejector. Generating vacuum with the actuator in the second position may further comprise closing the first valve and opening the second valve with the actuator in order to flow air through the second ejector.

The method may further comprise, in response to current or predicted compressor operation in a surge region, closing the first valve and opening the second valve with the actuator and flowing air from the compressor outlet to the compressor inlet through the second ejector. The method may also include in response to current or predicted turbocharger lag, opening the first valve and closing the second valve with the actuator. Vacuum generated by the first ejector and the vacuum generated by the second ejector may be directed to a vacuum actuator. The vacuum actuator may comprise one or more of a wastegate actuator, brake booster, and charge motion control valve. The vacuum generated by the first ejector and the vacuum generated by the second ejector may be directed to an engine gas ingestion device. The engine gas ingestion device may comprise one or more of a fuel vapor canister, engine crankcase, and intake manifold.

In another example, a method comprises during a first condition, generating vacuum via a first ejector by opening a first valve and closing a second valve with a common actuator and flowing air from a compressor outlet to an intake manifold through the first ejector, and during a second condition, generating vacuum via a second ejector by closing the first valve and opening the second valve with the common actuator and flowing air from the compressor outlet to a compressor inlet through the second ejector.

In an example, the first condition may comprise boost pressure above a threshold, and the second condition may comprise boost pressure below the threshold. In another example, the first condition may comprise current or predicted compressor operation in a surge region, and the second condition may comprise current or predicted turbocharger lag. The method may further comprise determining if the current or predicted compressor operation is in the surge region based on mass air flow rate and a level of provided boost. Current or predicted turbocharger lag may be determined based on a difference between desired boost pressure and actual boost pressure. The method may include directing the vacuum generated by the first ejector and the vacuum generated by the second ejector to a vacuum reservoir, the vacuum reservoir coupled to one or more vacuum consumers.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
providing an output of a sensor to a controller;
when boost pressure based on the output is below a threshold, generating vacuum via a first ejector by operating an actuator in a first position and flowing air from a compressor outlet to an intake manifold through the first ejector via the controller, the actuator coupled to the controller, wherein generating vacuum via the first ejector by operating the actuator in the first position further comprises opening a first valve and closing a second valve with the actuator via the controller in order to flow air through the first ejector; and
when boost pressure based on the output is above the threshold, generating vacuum via a second ejector by operating the actuator in a second position and flowing air from the compressor outlet to a compressor inlet through the second ejector via the controller.

2. The method of claim 1, wherein generating vacuum via the second electorby operating the actuator in the second position further comprises closing the first valve and opening the second valve with the actuator via the controller in order to flow air through the second ejector.

3. The method of claim 2, further comprising, in response to current or predicted compressor operation in a surge region, closing the first valve and opening the second valve with the actuator and flowing air from the compressor outlet to the compressor inlet through the second ejector via the controller.

4. The method of claim 3, further comprising response to current or predicted turbocharger lag as determined via the controller, opening the first valve and closing the second valve with the actuator.

5. The method of claim 1, further comprising directing the vacuum generated by the first ejector and the vacuum generated by the second ejector to a vacuum actuator via the controller.

6. The method of claim 5, wherein the vacuum actuator comprises one or more of a wastegate actuator, brake booster, and charge motion control valve.

7. The method of claim 1, further comprising directing the vacuum generated by the first ejector and the vacuum generated by the second ejector to an engine gas ingestion device via the controller.

8. The method of claim 7, wherein the engine gas ingestion device comprises one or more of a fuel vapor canister, engine crankcase, and intake manifold.

9. A method, comprising:
providing an output of a sensor to a controller;
during a first condition of boost pressure greater than a threshold boost pressure based on the output, generating vacuum via a first ejector by opening a first valve and closing a second valve with a common actuator that is coupled to the controller and flowing air from a compressor outlet to an intake manifold through the first ejector via the controller; and
during a second condition of boost pressure less than the threshold boost pressure based on the output, generating vacuum via a second ejector by closing the first valve and opening the second valve with the common actuator and flowing air from the compressor outlet to a compressor inlet through the second ejector via the controller.

10. The method of claim 9, wherein the first condition comprises current or predicted compressor operation in a surge region, and wherein the second condition comprises current or predicted turbocharger lag.

11. The method of claim 10, further comprising determining if the current or predicted compressor operation is in the surge region based on mass air flow rate and a level of provided boost via the controller.

12. The method of claim 10, wherein current or predicted turbocharger lag is determined based on a difference between desired boost pressure and actual boost pressure via the controller.

13. The method of claim 9, further comprising directing the vacuum generated by the first ejector and the vacuum generated by the second ejector to a vacuum reservoir, the vacuum reservoir coupled to one or more vacuum consumers.

14. A system for an engine, comprising:
a controller including non-transitory instructions executable to control a common actuator;
a first ejector positioned across a throttle in an air intake of the engine, a flow through the first ejector controlled by a first valve;
a second ejector positioned in a compressor bypass flow from the compressor outlet to the compressor inlet, a second flow through the second ejector controlled by a second valve; and
the common actuator configured to simultaneously adjust a position of the first valve and the second valve in response to at least one of boost pressure above a threshold, a compressor operation in a surge condition and turbocharger lag.

15. The system of claim 14, wherein the second valve comprises a continuously variable compressor bypass valve.

16. The system of claim 14, further comprising non-transitory instructions to activate the common actuator to open the second valve and close the first valve when boost pressure is above a threshold.

17. The system of claim 14, further comprising non-transitory instructions to activate the common actuator to open the second valve and close the first valve in response to compressor operation in a surge region.

18. The system of claim 14, further comprising non-transitory instructions to activate the common actuator to close the second valve and open the first valve in response to turbo lag.

* * * * *